April 13, 1937.  W. H. HOWE  2,076,944
GAUGING MECHANISM
Filed Oct. 14, 1933  6 Sheets-Sheet 3
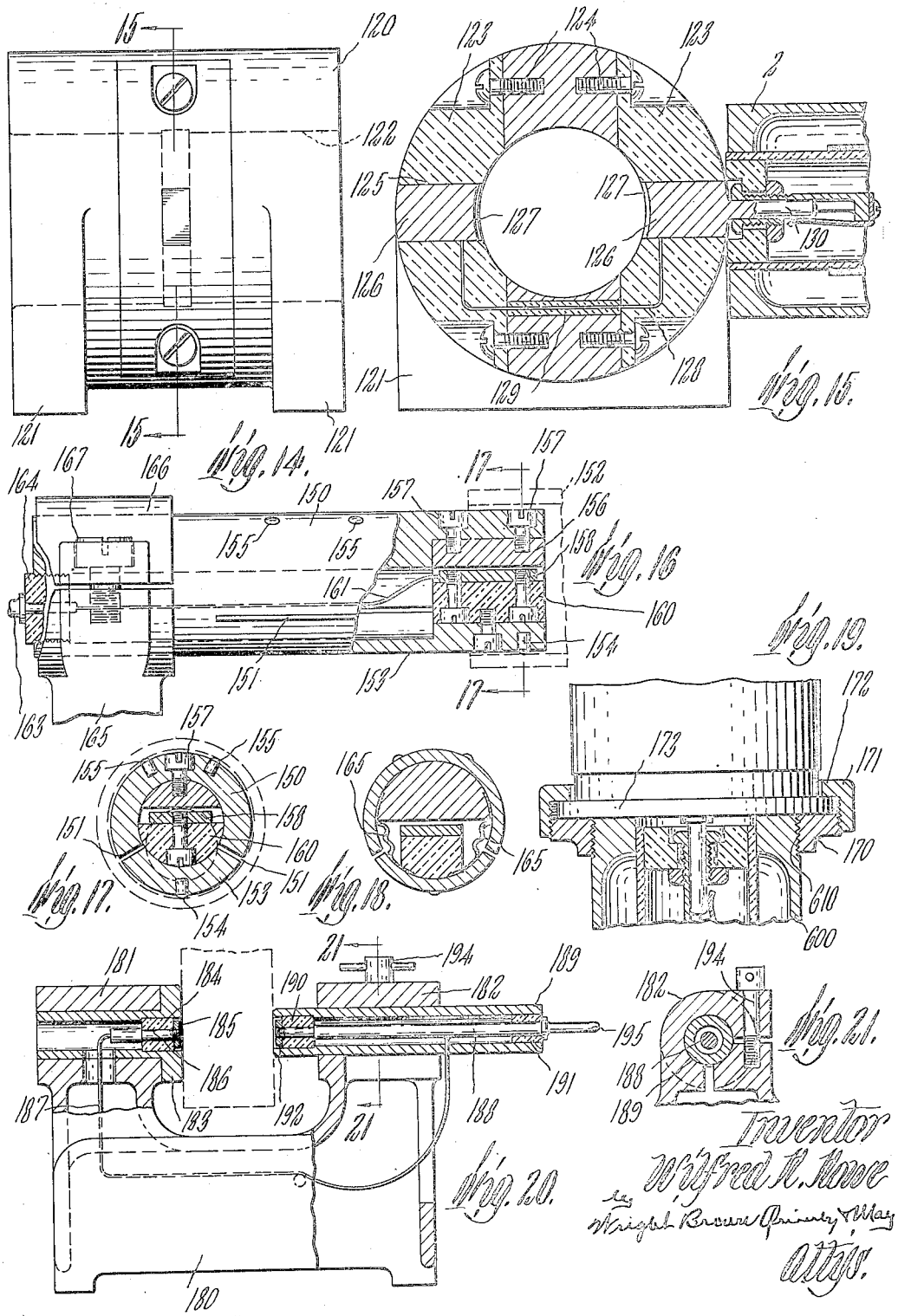

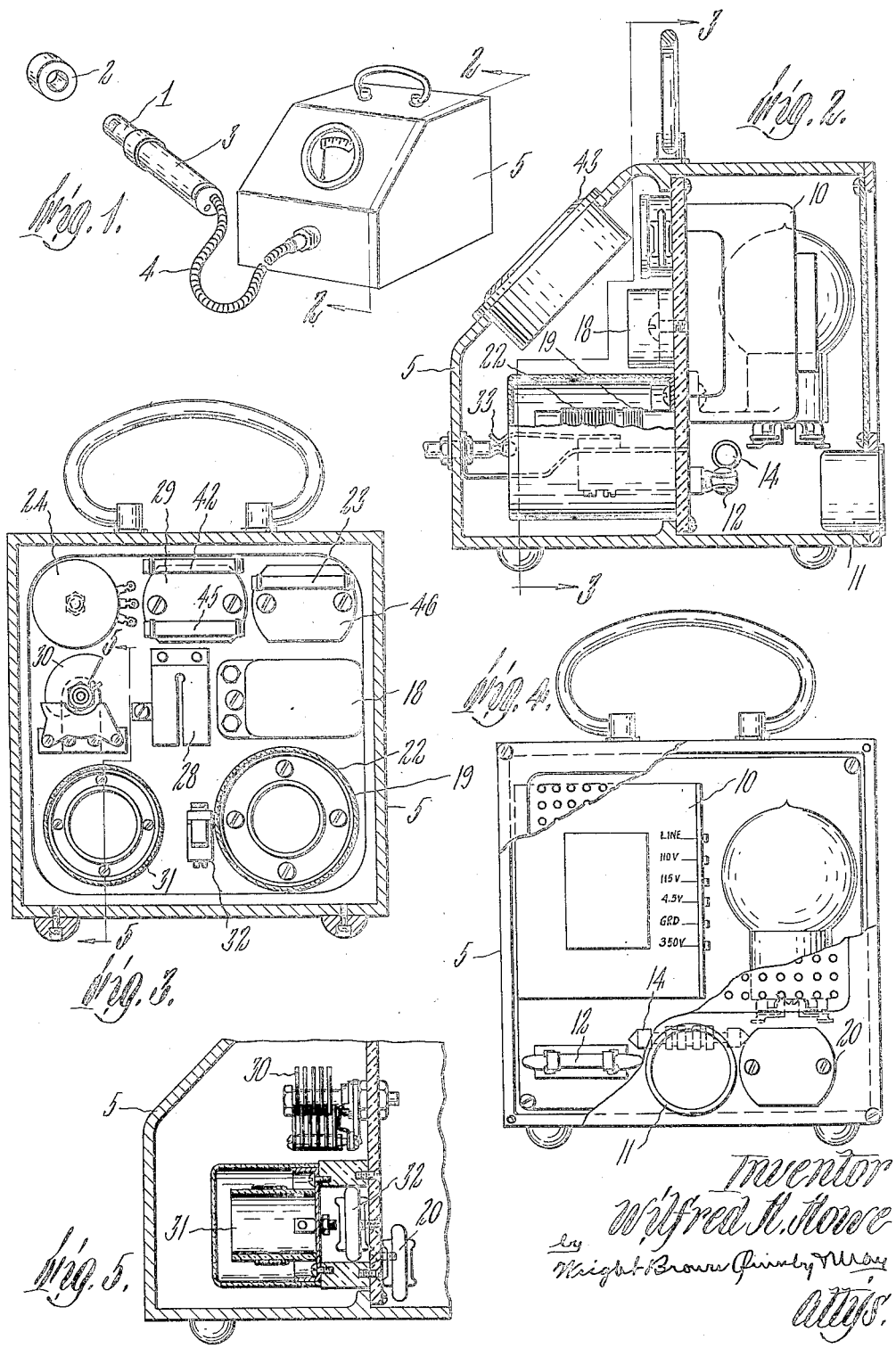

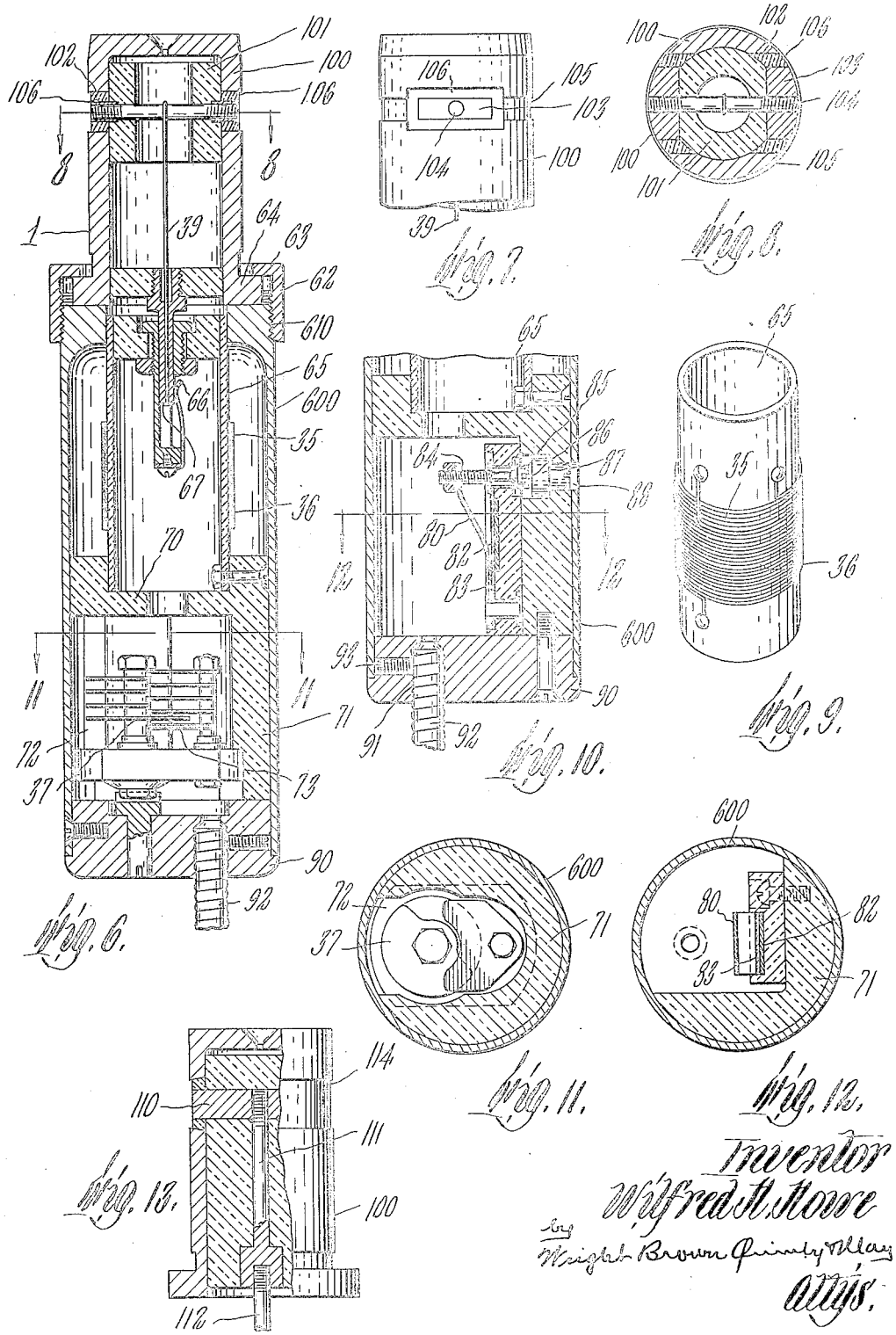

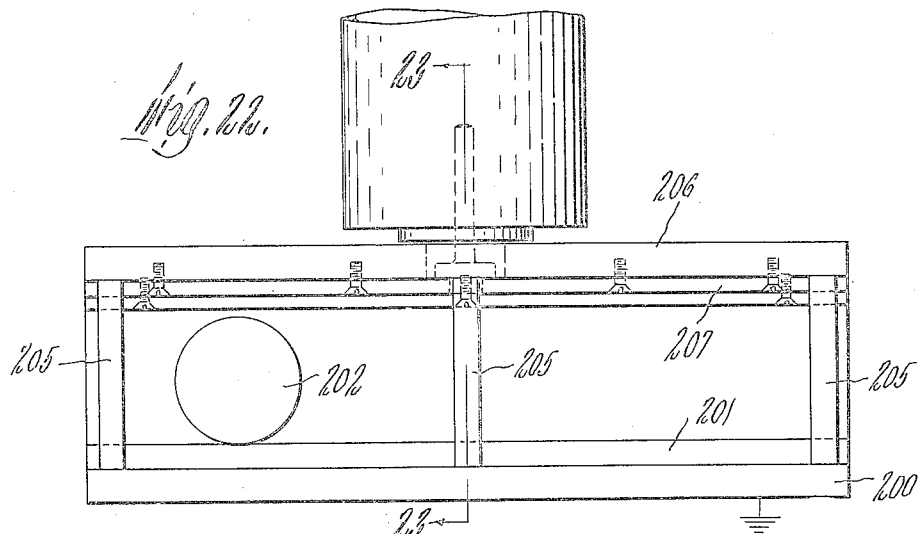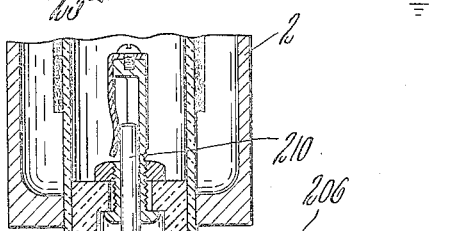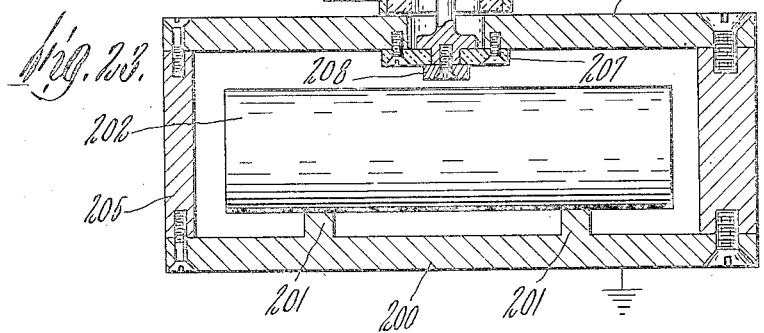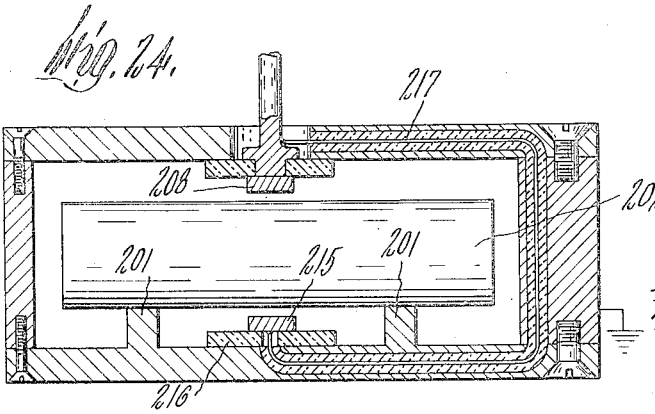

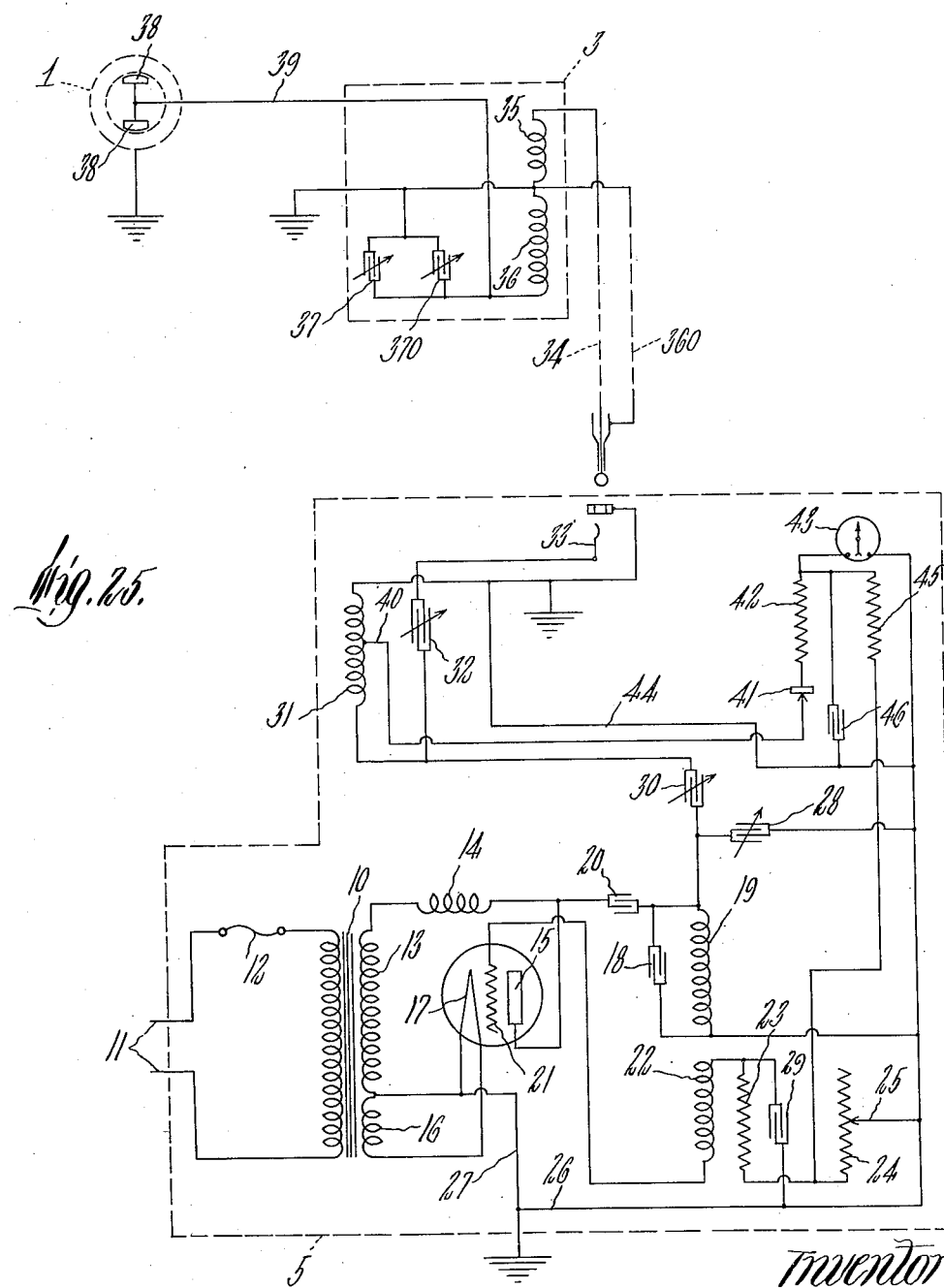

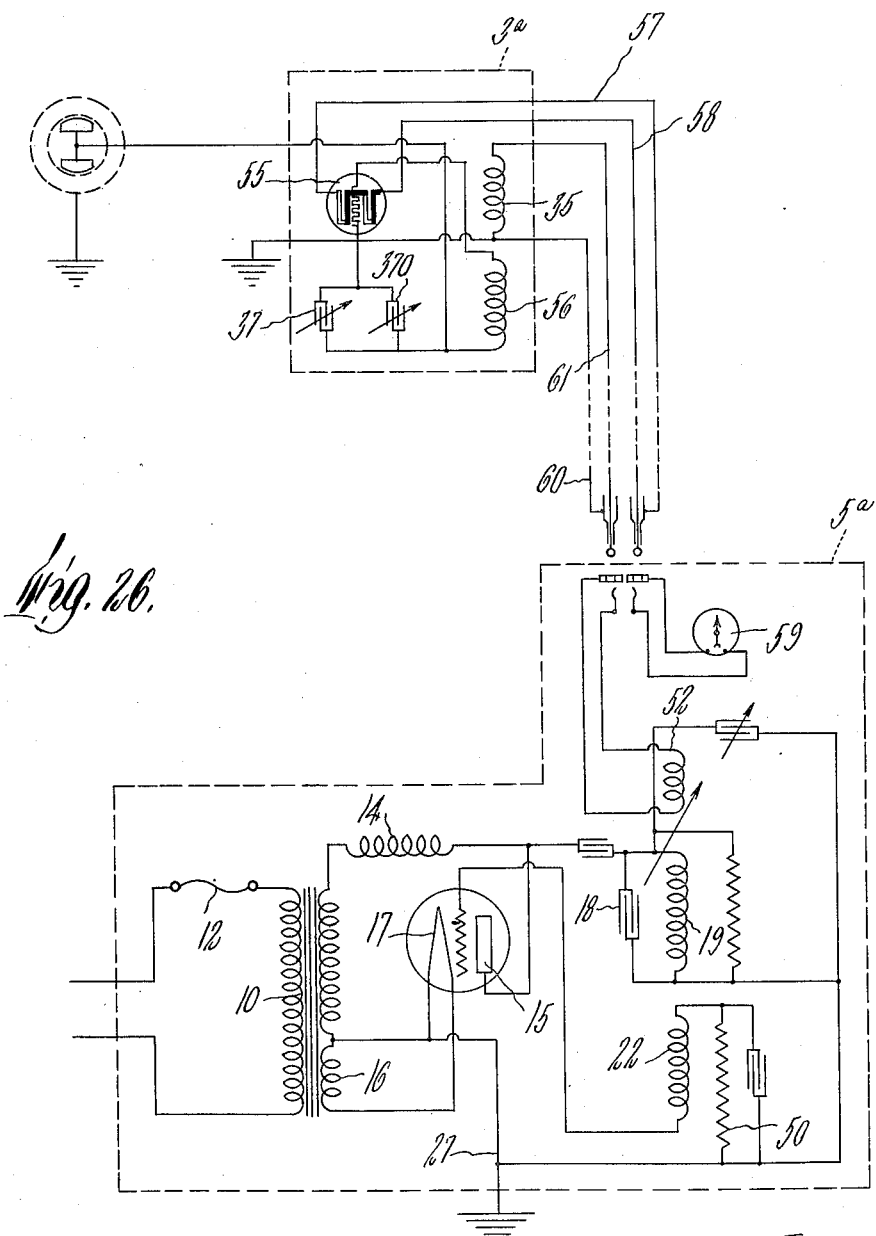

Patented Apr. 13, 1937

2,076,944

UNITED STATES PATENT OFFICE 2,076,944

GAUGING MECHANISM

Wilfred H. Howe, Winchester, Mass., assignor to The Cincinnati Milling Machine Co., Cincinnati, Ohio, a corporation of Ohio Application October 14, 1933, Serial No. 693,589

18 Claims. (Cl. 177—351)

This invention relates to mechanism for gauging work, more particularly, though not necessarily, metal work, and has for an object to provide such mechanism wherein the high accuracy and sensitivity of electrical methods may be combined with ready portability.

A further object is to provide a construction wherein the parts of the mechanism which cooperate directly with the work are interchangeable and are individually of simple and cheap construction so that a full set of such parts for gauging a considerable variety of work may be provided at a reasonable cost.

A still further object is to provide gauges in which the gauging elements are not in contact with the work when gauging is being done so that they are not subjected to wear.

A still further object is to so form such parts that they will not be adversely affected by the presence of moisture and oil.

For a more complete understanding of this invention, reference may be had to the accompanying drawings in which—

Figure 1 is a perspective showing a complete gauging mechanism and a hollow work piece to be gauged.

Figure 2 is a section to a larger scale on line 2—2 of Figure 1.

Figure 3 is a section on line 3—3 of Figure 2.

Figure 4 is a rear elevation partly broken away of the meter and oscillator unit.

Figure 5 is a detail section on line 5—5 of Figure 3.

Figure 6 is a longitudinal section through the gauging head showing one form of interior work-gauging element.

Figure 7 is a fragmentary elevation of the work-gauging element shown in Figure 6.

Figure 8 is a detail section on line 8—8 of Figure 6.

Figure 9 is a perspective of a coil and form shown in section in Figure 6.

Figure 10 is a fragmentary section similar to a portion of Figure 6 and showing a modified condenser element.

Figures 11 and 12 are detail sections on the correspondingly numbered section lines of Figures 6 and 10, respectively.

Figure 13 is a view partly in section and partly in elevation of a non-contacting gauging element illustrating a form somewhat modified from the constructions shown in Figures 6 to 8.

Figure 14 is a side elevation of an external non-contacting gauge element.

Figure 15 is a section on line 15—15 of Figure 14.

Figure 16 is a fragmentary view partly in side elevation and partly in longitudinal section showing a contacting internal gauge element.

Figure 17 is a detail section on line 17—17 of Figure 16.

Figure 18 is a view similar to Figure 17, but showing a modification.

Figure 19 is a fragmentary view partly in elevation and partly in section showing the use of an adapter for associating a large gauging element with other parts of a gauge head.

Figure 20 is a view partly in elevation and partly broken away and in section of an external gauging element.

Figure 21 is a detail section on line 21—21 of Figure 20.

Figure 22 is a fragmentary side elevation showing still another form of gauging element.

Figure 23 is a detail section on line 23—23 of Figure 22.

Figure 24 is a view similar to a portion of Figure 23, but showing a modification.

Figure 25 is a wiring diagram of the entire mechanism and for purpose of illustration showing an internal gauging element in the hook-up, though any of the other gauging elements might be substituted.

Figure 26 is a wiring diagram somewhat similar to Figure 25, but showing a modified circuit.

In order to carry out the purposes of this invention, the gauging apparatus is formed in three units or parts. The first comprises a gauging element 1 which is intended to be directly associated with the work 2 to be gauged. The second comprises an element 3 which may be used as a handle which may be grasped by the operator in order to present or remove the gauging element relative to the work, or it may be rigidly mounted as on a bench if desired, this unit enclosing certain electrical apparatus, as will later be pointed out, which it is essential to associate closely with the gauging element 1. By using this unit 3 to which the element 1 may be detachably secured, the electrical apparatus carried by the unit 1 is reduced to such simplicity that the cost of such a gauging unit is relatively small so that a considerable number may be provided for association interchangeably with the same unit 3 and yet permit the whole to be marketed at a low price. The third comprises a unit 5 to which the electrical devices within the unit 3 are detachably connected through a flexible lead 4. The unit 5 contains the indicating instrument and other parts of the electrical mechanism necessary to cause variation in dimension of the work to be gauged to cause an indication to be made on the instrument. As will later be pointed out, this unit 5 contains the more sensitive and expensive portions of the apparatus which may be located at any convenient point where they are not subjected to such severe conditions of service as the element 1 may be subjected to when it is employed in connection with machines performing machining operations on work.

In Figure 25 a wiring diagram of one form of the whole apparatus has been illustrated, showing the parts located in the various units of the apparatus. Referring to this figure, the unit 5 contains the transformer 10 which may be energized from any suitable alternating current power socket from an ordinary electric lighting circuit, as through the leads 11. A fuse 12 is shown as included in one of the leads. The secondary 13 of the transformer 10 supplies alternating voltage through the choke 14 to the plate 15 of an oscillator tube. The secondary 16 of the transformer 10 supplies current to the filament 17 of the tube. In the plate circuit is the tuning condenser 18 and the plate coil 19 fed through the blocking condenser 20. The grid 21 of the oscillator tube has in circuit therewith the grid coil 22 in inductive relation to the plate coil 19, the grid resistor formed in two parts 23 and 24, and the grid condenser 29. The plate circuit and the grid circuit have the common return lead 26 which is connected to the grounded side 27 of the filament. At 28 is shown a thermostatic condenser across the plate circuit which varies in capacity with the temperature of the oscillating unit and serves to correct for variations in capacity which occur with changes of temperature of the oscillator.

At 30 is shown a coupling condenser leading to a secondary resonant circuit. From this coupling condenser 30 high frequency power is fed to the intermediate tapped inductance 31 and the intermediate condenser 32. This intermediate condenser 32 may be fixed when constant sensitivity is required. As shown it is variable so that the sensitivity may be varied. This intermediate condenser 32 leads to the high potential side 33 of the coupling jack to which connection may be made through the shielded cable shown in Figure 1 containing the high frequency lead 34 to a coupling coil 35 in the head unit 3. The return is through the ground lead 360 also contained within the cable 4 to ground and the upper end of the intermediate coil 31. The coil 35 in the head 3 connects to a coil 36 which is in series with the trimming condenser 37 and the thermostatic condenser 370 which lead to ground. This thermostatic condenser 370 in the unit 3 corrects for temperature variations closely adjacent to the work, and when such changes are not to be anticipated in practice it may be omitted. Between the lower end of the coil 36 and these condensers a high frequency lead 39 passes to high frequency plates 38 of the gauge element 1. As illustrated this gauge element is of a form in which one side may be grounded through the work, but where this is not possible a separate ground lead will, of course, be carried back to the head 3. The inductance 36 has an impedance approximately equal to the sum of the three condensers 37, 370, and 38 in parallel. This circuit as a whole has an impedance approaching that of parallel resonance, a small variation in the capacity of the condenser 38 producing a large change in this impedance. This total impedance is reflected through the coupling between coils 35 and 36 into the winding 35, the effective impedance of this coil representing a value proportional to that of the total head circuit and thus varying considerably with small changes of the capacity 38.

This effective impedance of coil 35 is approximately equal to the impedance of condenser 32. For certain values of capacity 38 (slightly outside the normal measuring range), the effective impedance of coil 35 is exactly equal to that of condenser 32, thus producing series resonance. For a value of impedance of 35 corresponding to a value of impedance 38 somewhat outside the measuring range but on the opposite end from series resonance, the circuit consisting of inductance 35 and capacity 32 taken as a whole has an impedance equal to the impedance of inductance 31. In this case, parallel resonance between coil 31 and the circuit including capacity 32 and inductance 35 exists. Thus for the values of capacity 38 within the working range, there exists a condition of the circuit lying between series resonance and parallel resonance.

It is apparent that in the condition of series resonance, the potential across the circuit will be quite low while for parallel resonance, this potential will be quite high and that the potential between ground and tap 40 of the coil 31 will vary accordingly, this variation appearing as a variation of the reading of a high frequency voltmeter. Thus the reading of the high frequency voltmeter gives a measure of the measuring capacity which includes the plates 38. The high frequency voltmeter, as shown, consists of the copper oxide rectifier 41, the limiting resistance 42 and the galvanometer 43, the opposite side of which connects to the ground wire 44. The effects of this series-parallel resonance are more fully explained and claimed in my application for Patent Serial No. 661,429, filed March 11, 1933, for Impedance variation amplifier. As shown this circuit also contains means for compensating for voltage variations of the power circuit applied to the transformer 10. This compensation per se is not claimed herein, but forms the subject matter of my application filed November 29, 1933, Serial No. 700,234, for Voltage compensation. This compensating circuit acts to supply a voltage to the galvanometer in reverse direction to that applied from the coil 31 and of an amount varying with voltage changes in the power line. This voltage is taken from the tap 25 of the grid circuit in the return line of which is the resistor 45 and the by-pass condenser 46. By properly adjusting the values of the resistances 42 and 45 and the position of the tap 25, the variations in voltage taken off at the point 40, due to variations in supply voltage, may be exactly counterbalanced at any desired reading of the galvanometer 43 by an opposite direct current component of the grid voltage. All the circuit parts contained within the casing 5 are indicated as enclosed in the same numbered dotted line in Figure 25. Likewise the parts enclosed within the casing 3 are shown as enclosed in a similar numbered dotted outline in Figure 25.

Instead of employing the circuit shown in Figure 25, the modified circuit shown in Figure 26 may be used. The oscillator circuit is the same as that previously described, except that the grid resistor is not divided as shown in Figure 25, being indicated as a whole at 50. A variable coupling between the coils 19 and 52 for the secondary or excited circuit is illustrated through the coupling coil 52. The relative values of the various parts are preferably as disclosed in the Field patent, No. 1,813,488, granted July 7, 1931, so that the circuits are inherently self-compensating for voltage changes. The head 3a contains, beside the coil 35 and the condensers 37 and 370, a thermo couple at 55 and a coil 56 in inductive relation to the coil 35 and forming the secondary circuit. Direct current produced by heating of the thermo couple 35 is then led back through the leads 57 and 58 to the millivoltmeter 59 contained within the casing 5a. The oscillatory circuit containing the oscillator and the secondary circuit in the head 3a are thus connected by the low voltage coupling circuit loosely coupled at both ends through the coils 56, 35 and 52, 19 the leads 60 and 61 being contained preferably within the same cable which contains the direct current leads 57 and 58.

With either of these circuits of Figures 25 and 26 it will be noted that the more sensitive parts, including the indicating instrument, the oscillator tube, and the parts more intimately associated therewith, are all contained within the casing 5 which may be somewhat remote from the work to be gauged. The head 3 contains parts which are intimately associated with the measuring condenser and which cannot be readily separated therefrom without complications due to variable capacity to ground and other factors which would be very troublesome, although the parts contained in the head 3 and the casing 5 may be separated from each other without causing trouble through such capacity variations. When using the circuit of Figure 25 it is necessary to employ a shielded cable, but when this is done no difficulties are experienced from capacity to ground changes. When using the circuit of Figure 26 no shielding of this connecting lead is necessary. The head 3 and the gauging elements may, however, be so formed that they can be readily attached or detached so that the gauging element may have to contain only the measuring impedance, or where one side may be conveniently grounded, only the high potential plate of a measuring condenser. Thus the gauging elements themselves may be made cheaply so that a great variety of them may be furnished in a set without undue cost.

One form of head 3 is shown in Figure 6. Referring to this figure, it will be seen that it comprises a cylindrical metallic shell 600 externally threaded at one end as 610 to receiving a correspondingly threaded securing cap 62 having an in-turned flange 63 which may engage the outer face of an outwardly extending flange 64 on a gauging element. Within the shell 60 is shown positioned a tubular form 65 carrying the coils 35 and 36 shown in Figure 25, wound as a single coil tapped off between its ends. At 66 is shown a jack for receiving a pin 67 forming a part of the lead 39 leading to the condenser plates 38 of the gauging element 1. This casing 600 is provided with an insulating partition 70 having a side wall 71 defining therewith a chamber 72 for the condensers 37 and 370, the latter one of which may comprise a plate of thermostatic metal as at 73 cooperating with one of the adjacent moving plates of the condenser 37. Figures 6 and 11 show the condenser 37 as of the rotating type but it may, if desired, be of the type shown in Figure 10 comprising an adjustable plate 80 and a fixed plate 82 separated by a dielectric sheet material 83. The adjustment of the plate 80 relative to the plate 82 is effected through an adjusting screw 84 engaging one end of the plate 80 and having a slotted head 85 with which is engaged a rib 86 in a rotary driving element 87 accessible for adjustment as by a screwdriver through an opening 88 in the shell 600. The lower end of the casing is enclosed by the metal plug 90 which may have a socket 91 for the reception of one end of the armored conduit 92 which may be secured therein as by the set screw 93 and through which the leads from the casing 5 extend. The casing 600 so formed furnishes adequate protection for the parts housed thereby from access of oil or moisture.

In Figures 6, 7 and 8 is shown one form of non-contacting caliper arranged for calipering internal diameters. As shown this comprises a cylindrical metal shell 100 at one end of which is the flange 64 by which it may be clamped to the head member 3. This shell 100 is provided with an internal insulating sleeve 101 adjacent to one end where it is provided with oppositely disposed apertures 102. Within each of these is seated a plate 103, the two plates being joined together by any suitable means such as the pin 104 shown as threaded at opposite ends into each and supported in perforations through the sleeve 101. Each plate is insulated from the adjacent walls of the shell 100 as by insulating material at 106 and after assembly of the parts the shell 100 is machined on its outer face and preferably finish ground with a peripheral groove as at 105 in a line with the plates 103 so as to cause the outer faces of these plates to be spaced inwardly subjacent to the outer face of the shell 100 nearest thereto, so that when the shell 100 is inserted into the opening to be gauged within which it may pass, the plates 103 are held slightly out of contact therewith. These plates form the high potential plates of the measuring condenser, being connected to the jack pin 67 by the lead 39. The low potential plates comprise the metal work itself which is being gauged and which is grounded.

In Figure 13 a somewhat similar construction is shown except that instead of fixing the condenser plates together as by a threaded pin, they comprise a single metallic bar shown at 110 which extends diametrically of the shell 100. This piece 110 is shown as having threaded thereinto a conducting rod 111 to which is secured the jack pin 112 for engagement with the jack in the unit 3. The piece 110 and the pin 111 are shown as encased in insulating material and likewise the end portions of the bar 110 are similarly spaced from the adjacent walls of the casing 100 by insulation which may be flowed therebetween when in molten condition. Here also the end faces of the bar 110 are ground off so as to be subjacent to the adjacent portions of the outer shell surface disposed axially on either side thereof as by forming the peripheral groove 114 in the outer face of the gauging member.

In Figures 14 and 15 a gauging element for gauging external work is shown. This comprises a metal block 120 which may be provided with suitably spaced supporting feet 121 and provided with an axial opening 122 for the reception of the work to be gauged. A portion of each side of the block 120 is shown as cut away so that there may be secured therein the segmental shaped blocks of insulation shown at 123. These may be secured by screws 124. Each is provided with a radial opening 125 within which may be fixed a metallic block 126. The inner faces of these blocks are positioned slightly outwardly of the interior faces of the hole 122 as at 127 so as to be subjacent thereto and held out of contact with the work to be gauged extended into this opening. The two blocks 126 are shown as connected by a conducting lead 128 insulated from the body of the member 120 as by the insulating sleeve 129 through which it passes and one of the blocks 126 is provided with an outwardly extending conducting pin 130 for engagement within the jack of the head 2. The pieces 126 thus constitute high potential plates of the measuring condenser, the metal article to be gauged itself forming the low potential plates.

In Figures 16, 17 and 18 another form of internal gauge applicable to both conducting and non-conducting work testing is illustrated. This gauge comprises a cylindrical shell 150 slotted inwardly from one end as at 151 to form a pair of jaw members which may be sprung toward each other by insertion into work shown in dotted lines at 152 and which is of proper internal diameter to produce this action. One of the split portions as 153 may be provided with a rounded outwardly extending pin 154 for contact with one side of the interior of the hole while the other portion may be provided with a pair of spaced rounded pins 155 to engage the interior of the work at points angularly spaced from the pin 154. To one of these split portions may be secured a grounded condenser plate as 156 and which may be in direct electrical contact therewith and grounded therethrough, being shown as secured as by screws 157. The other or high frequency plate 158 is shown as supported through the insulating block 160 from the portion 153, and secured thereto may be a conductor 161 leading to the solid end of the member 150 where it may be secured to the jack pin 163 held in the member 150 through the insulating bushing 164. This member 150 may be supported in a suitable standard, a portion of which is shown at 165 and which may have a split sleeve 166 at its upper end which may be clamped to the member 150 as by the clamp screw 167. If desired the two jaw portions of the gauging member may be protected against the entry of foreign matter therebetween as by corrugated metal foil pieces 165 shown in Figure 18, which are yieldable to permit spacing variations between the two jaw members.

In Figure 19 is shown a construction whereby a gauging member of a relatively large size may be associated and secured to the head member 2. In place of the securing ring 62 shown in Figure 6, a ring 170 threaded both internally and externally may be engaged with the threaded portion 610 of the head and a clamping ring 171 of a sufficiently large internal diameter to engage the exterior of the ring 170 may have an in-turned flange 172 engageable with the large diameter flange 173.

In Figures 20 and 21 is shown a gauge element for external dimensions. As shown it comprises a base 180 having upwardly extended spaced sleeve portions 181 and 182 between which the work to be gauged may be placed. In one of these portions as 181 is shown positioned a flanged bushing 183 having an opening to receive an insulating bushing 184 supporting a conducting condenser plate 185. A threaded securing stem 186 for this condenser plate passes through the bushing 184 and is connected by a lead 187 spaced from the base member 180 to a rod 188 extending axially through a sleeve 189 which is slidably mounted in the portion 182 in spaced axial relation to the sleeve 181. The rod 188 is supported by spaced insulating sleeves 190 and 191 and inwardly of the sleeve 190 it carries the condenser plate 192. It may be fixed in adjusted axial position as by means of a screw clamp 194 passing through split parts of the member 182 and outwardly of the sleeve 191 it is provided with a jack pin 195 for engagement with the jack of the member 3. After the sleeve 189 has been adjusted to the desired axial position, placing grounded metallic work to be gauged between the condenser plates may be caused to give an indication of relative dimensions of this work and a standard piece.

In Figures 22 and 23 a gauge particularly suitable for testing the diameter and roundness of cylindrical or other round work is illustrated. As shown the gauge comprises a base member 200 provided with a pair of spaced rails 201 along which the work 202 may be passed as by rolling along the rails 201. Spaced above the rails 201, as by posts 205, is a top member 206 which carries insulated therefrom by the insulation 207 a conducting strip 208 which is arranged parallel to the top faces of the rails 201. To this strip 208 is fixed the jack pin 210 which may be engaged with the jack of the head 3. The rails 201 as shown in these figures are of conducting material and are preferably grounded in any suitable manner so as to ground the work 202, which for this gauge must be conductive. The strip 208 and the work 202 with their interposed air dielectric thus form the measuring condenser, the capacity of which indicates the diameter of the work at any instant, and variations of this indication as the work is passed along the rails 201 indicate variations from exact cylindrical contour of the work.

In Figure 24 a slight modification is shown in which besides the upper plate or strip 208 above the work, a similar strip 215 is insulatingly supported on the strip 216 between the rails 201, the strips 208 and 215 being placed in electrical connection through the wire 217 insulated from the supporting frame and the rails 201, so that together these strips act as a single condenser plate with the work 202 acting as the opposite plate.

From the foregoing description of certain embodiments of this invention, it should be evident to those skilled in the art that various changes and modifications might be made without departing from the spirit or scope of this invention as defined by the appended claims.

I claim:

1. A gauge comprising a condenser plate, a conductor support for an article to be tested spaced a predetermined distance from said plate and insulated therefrom, and a lead insulated from said support and connected to said plate.

2. A gauge comprising spaced conductive rails along which an article to be gauged may move, a condenser plate insulated from said rails and between which and said rails the article passes, and a lead extending from said plate and insulated from said rails.

3. A gauge comprising spaced conductive rails along which a generally cylindrical conductive work piece may be passed, a pair of condenser plates spaced apart and between which said work piece passes, and a conducting lead joining said plates and insulated from said rails.

4. A gauge comprising spaced rails along which generally cylindrical work may be passed, a pair of condenser plates spaced apart and between said work piece passes, and a conducting lead extending from one of said plates.

5. A measuring mechanism comprising a gauge including spaced conductive rails along which an article to be gauged may move, a condenser plate insulated from said rails and between which and said rails the article passes, and indicator means responsive to the electrical capacity of said plate and article and interposed air dielectric.

6. A gauging member having a pair of opposed work-gauging faces for cooperation with opposed portions of work to be gauged, and means for holding said faces out of contact with but in cooperating relation to the work during a gauging operation.

7. A gauging member having a portion for engagement with work to be gauged, and an electrical element carried by said member and responsive in electrical capacity characteristic with the work engaged by said member to a dimension of the work with which said member engages.

8. A gauging member having a surface for presentation into contact with a surface of work to be gauged, a conductive plate having a face subjacent to said member face to be out of contact with but in cooperating relation to said surface, said member including means insulating said plate from the work and therefrom, and a lead secured to said metal plate.

9. A gauging member for internal work, said member having a portion insertable into the work to be gauged to contact therewith, and a gauging element carried by said portion and held thereby out of contact with but in cooperative relation to the work.

10. A gauging member having a pair of spaced surfaces for presentation to oppositely disposed surfaces of work to be gauged, a pair of opposed conductive plates having active faces subjacent to said surfaces to be out of contact with but in cooperative relation to the work, said member including means for insulating said plate from the work, an electrical connection between said plates, and a lead in electrical connection therewith.

11. A gauge comprising a tube slotted longitudinally for a portion of its length to define a pair of relatively yielding parts for engagement with the work, a pair of opposed condenser plates one carried by each part and insulated from each other, and electrical connections to said plates.

12. A gauge comprising a tube slotted longitudinally for a portion of its length to define a pair of relatively yielding parts for engagement with the work, a pair of opposed condenser plates one carried by each part and insulated from each other, and yieldable sealing means connecting said relatively yielding parts against entry of foreign matter therebetween.

13. A gauge comprising a metal tube slotted longitudinally for a portion of its length to define a pair of relatively yielding parts for engagement with the work, a pair of opposed condenser plates one carried by each part and insulated from each other, and a high potential lead insulated from said tube extending to one of said plates, the other of said plates being in electrical connection with said tube.

14. A gauging member having a conductive plate for presentation into gauging relation to the work to be gauged, and means for supporting said plate opposite to a face of said work but out of contact therewith.

15. A gauging member having a portion for engagement with the work to be gauged, and an electrical element carried by said member and having a working face for cooperation with a portion of the work to be gauged, said gauging member supporting said element out of contact with the work to be gauged during a gauging operation.

16. A gauging member for internal work, said member having a portion insertable into the work to be gauged to contact therewith, a capacitative gauging means responsive to a dimension of the work when said portion has been inserted therein and including at least one plate of an electrical condenser carried by said portion and supported thereby out of contact with the work when said gauging member is in gauging position.

17. A gauging device for gauging the distance between opposing electro-conductive surface portions electrically connected, comprising a condenser plate structure, supporting means for supporting said plate structure and adapted to position said plate structure substantially centrally between said surface portions but out of contact therewith, said surface portions and said plate structure coacting to form a condenser, the distance of said plate structure from said surface portion determining the electrical capacity of said condenser which capacity becomes inversely proportional to the distance between said surface portions.

18. A gauging device comprising, in combination, supporting means having guiding surfaces, and electrically operated gauging means supported by said supporting means subjacent to said guiding surfaces, said guiding surfaces being adapted by contact with said work to position said supporting means with respect to said work so that the gauging means is in proper position for measurement and out of contact with said work.

WILFRED H. HOWE.